Sept. 27, 1955    K. K. KEARBY ET AL    2,719,112
CONTACTING GASES WITH FLUIDIZED SUBDIVIDED SOLIDS
Filed Feb. 28, 1951    3 Sheets-Sheet 1

Kenneth K. Kearby
Walter G. May    Inventors
By    Attorney

Sept. 27, 1955  K. K. KEARBY ET AL  2,719,112
CONTACTING GASES WITH FLUIDIZED SUBDIVIDED SOLIDS
Filed Feb. 28, 1951  3 Sheets-Sheet 2

Kenneth K. Kearby
Walter G. May  Inventors

By L. F. Nary  Attorney

Sept. 27, 1955 K. K. KEARBY ET AL 2,719,112
CONTACTING GASES WITH FLUIDIZED SUBDIVIDED SOLIDS
Filed Feb. 28, 1951 3 Sheets-Sheet 3

Kenneth K. Kearby
Walter G. May   Inventors

By L. F. Mant   Attorney

United States Patent Office 2,719,112
Patented Sept. 27, 1955

2,719,112

CONTACTING GASES WITH FLUIDIZED SUBDIVIDED SOLIDS

Kenneth K. Kearby, Cranford, and Walter G. May, Roselle, N. J., assignors to Esso Research and Engineering Company, a corporation of Delaware Application February 28, 1951, Serial No. 213,078

7 Claims. (Cl. 196—52)

The present invention relates to an improved method of contacting gases with fluidized solids maintained by the upflowing gases in the form of a relatively dense highly turbulent mass within a contacting zone. More particularly, the invention pertains to improvements in gas-solids contact and circulation of gases and solids within fluidized solids masses of the type specified. In its broadest aspect, the invention involves the tangential injection of gases into the fluidized solids mass at a velocity sufficient to superimpose a vortex flow motion on the normal mixing pattern of a fluidized solids mass.

In the type of dense phase fluid operation here involved, gases or vapors are passed upwardly through a mass of subdivided solids of fluidizable size, such as 5–500 microns, depending on the character of the solids, maintained in a vertical contacting vessel. At gas velocities of about 0.1–10 ft. per second, the fluidized solids mass may be maintained in a highly turbulent state resembling a boiling liquid with respect to appearance as well as hydrostatic and hydrodynamic properties. The turbulent fluidized mass which may have an apparent density of, say, about $\frac{1}{5}$ to $\frac{9}{10}$ the normal settled density is separated by an upper interface from a dilute phase of substantially lower density.

It is generally recognized that gas-solids contacting in dense phase fluid operation affords certain advantages over fixed bed, compact moving bed or dilute phase suspensoid operation with respect to efficiency of gas-solids contact and heat transfer as well as ease of solids handling. Fluid solids processes have, therefore, found widest application in many technical fields, such as catalytic gas phase reactions, particularly hydrocarbon conversions or synthesis, non-catalytic reactions involving gas-solids contacting, such as gasification or carbonization of carbonaceous solids, roasting and reducing of ores, adsorption processes of all types, heating or cooling methods involving direct or indirect heat transfer between solids or solids and gases, etc.

In practice, fluidized beds are composed of solids having a relatively wide particle size distribution. More particularly, in the fluidization of masses containing relatively coarse particles the fluidized mass should consist of particles of widely differing sizes including fines of −20 microns diameter and particles of intermediate sizes so as properly to fluidize the coarse particles having diameters of, say, 100 microns and larger. In conventional fluid operation, all these particles are subjected to substantially uniform conditions of gas-solids contacting. This may not always be desirable. In addition, as a result of perfect mixing, solids withdrawn from a fluidized bed continuously supplied with fresh solids normally will consist of particles having been treated for an average length of time rather than of particles treated for the longest time. That is, such withdrawn solids will always contain a substantial proportion of fresh insufficiently treated solids. It has also been observed that in spite of the use of efficient gas distributing means, such as grid plates in the bottom of the contacting vessel, the formation of large gas bubbles which rise in rapid succession particularly along the vessel walls so as to cause undesirable gas channelling, cannot be completely avoided in conventional operation.

Various means have been proposed for eliminating these difficulties. Most of these means involve the use of solid or perforated horizontal or vertical baffles which unduly complicate reactor design and operation. It has also been suggested to break up large gas bubbles rising through the fluidized mass by forcibly directing fluid toward the vertical axis of the bed in a radial direction from a plurality of points spaced around the periphery of the bed. While this method improves the contact between solids and gases by reducing the tendency of the bed to channel, it does not permit a selective treatment or perferential withdrawal of certain constituent particles of the bed. The present invention overcomes the shortcomings of these prior art methods.

It is, therefore, the principal object of the present invention to improve the gas-solids contact in dense, turbulent fluidized solids masses. Another object of the invention is to permit the selective treatment and withdrawal of constituent particles of such masses. Other objects and advantages will appear from the subsequent description of the invention read with reference to the accompanying drawing.

It has now been found that the aforementioned objects may be accomplished by injecting a gasiform fluid tangentially into the fluidized solids mass at a point and at a velocity adequate to create a solids turbulence characteristic for fluid operation and to superimpose a vortex flow of solids on this normal mixing pattern of the fluidized bed. In many cases, it may be desirable to supply fluidizing gas or vapor at a fluidizing velocity upwardly to the bottom of the fluidized mass, uniformly distributed over the cross-sectional area of said mass in order to improve the fluid character in the bottom of the bed and/or to promote solids classification as will appear more clearly hereinafter. The tangential fluid injection may take place at a plurality of points distributed over the periphery and/or height of the main body of the fluidized bed. Whenever a fluidizing gas is introduced upwardly into the bottom of the bed, the fluid so introduced may be the same as, or different from, that introduced tangentially into the fluidized mass. The linear superficial flow velocity of the tangentially injected fluid may fall within the approximate range of 400–1500 ft. per second but should preferably be maintained within subsonic ranges at the prevailing conditions and, more advantageously, within the lower brackets of the range specified, say at about 400–800 ft. per second to minimize attrition. The flow velocity of any fluidizing gas supplied to the bottom of the mass may be within the conventional fluidizing range of about 0.1–3 ft. per second. It should preferably be closer to the low end of this range, say between 0.1–0.5 ft. per second, particularly if large solids are to be preferentially withdrawn from the bottom, as will appear more clearly hereinafter. In order to reduce friction losses against the reactor wall, care should be taken to prevent the tangentially injected gases from hitting the vessel wall immediately upon their discharge. This may be accomplished by inclining the injection pipe a few degrees toward the vessel center or by locating the discharge end of the pipe a small distance removed from the vessel wall. In other words, the gas is injected into the fluidized mass along a non-radial, secant path, rather than being injected at the reactor wall along a path that is truly tangential with respect to the circumference of the cylindrical reactor. The vortex flow in accordance with the invention is such that a circular motion exists in the fluid bed which is not sufficient to cause a substantially solid free zone to form at the center of the bed. The apparent density of the fluidized mass maintained in accordance with the invention is about 1/5–9/10 that of the normal settled density of the solids.

Various effects are accomplished when operating in accordance with the invention. The circular motion set forth herein is one which describes an overall direction of flow of the bulk of the fluid bed rather than that of individual particles within the bed. The individual solids particles move within a given volume of the fluidized bed in much the same manner as in an ordinary fluidized bed. However, the bulk of the bed travels in a general circular path which also has a vertical component. The bed density near the vessel walls is increased and solids circulation becomes more rapid. An appreciable classification of solids by particle size or specific gravity occurs, relatively large or heavy particles accumulating in the outer portions of the bed and tending ultimately to build up in relatively high concentration at the bottom periphery of the bed. By supplying gas at the bottom at a relatively low linear velocity (for example less than 0.5 ft. per second), this segregation is greatly improved; very coarse material whose minimum fluidization velocity is greater than the gas velocity at the bottom will actually settle out at the edge in an unfluidized condition and may be readily withdrawn. Finally, large gas bubbles are broken up and channelling is reduced so that fluidization efficiency is improved. This effect combined with the increased circulation velocity of the solids permits at least a temporary fluidization of particles which are too large or too heavy to be fluidized under normal conditions. In addition, the invention has utility in many processes in which a selective gas treatment of certain constituent particles of the fluidized bed is desirable.

For example, in the gasification of coke or coal with steam to produce gas mixtures containing hydrogen and carbon monoxide in dense phase fluid operation wherein the heat required is generated by carrying out a limited combustion within the fluidized bed, it has been observed that the coke particles in the upper portions of the fluidized bed contain relatively large amounts of hydrogen adsorbed on their surface. This is due to the fact that hydrogen is produced as the steam fed to the bottom of the bed rises to the top of the bed so that the hydrogen concentration is higher in the top than in the bottom of the bed. The adsorption of hydrogen on the surface of the coke particles results in slowing down the rate of reaction of these coke particles with steam. The air and/or oxygen needed for heat generation is normally supplied together with the steam to the bottom of the bed so that predominantly fresh feed solids substantially free of adsorbed hydrogen are burned. In accordance with the present invention, oxygen and/or air, preferably together with steam, is injected tangentially at one or more intermediate points along the height of the turbulent bed which may be further fluidized by gases supplied to the bottom of the bed. Due to the downward flow of solids in the periphery of the resulting vortex, particularly in the case of bottom feed of solids and peripheral bottom withdrawal of solids, the oxygen introduced tangentially is contacted with hydrogen-carrying solid particles descending from the top of the bed in preference to fresh hydrogen-free feed solids. In this manner, hydrogen is removed from the particles undergoing combustion whereby the overall reaction with steam is accelerated. Simultaneously, the carbon dioxide formed in the combustion reaction is more completely reduced to carbon monoxide because it is forced to rise through a larger portion of the coke bed as compared with combustion taking place in the top of the bed.

The classification effect afforded by the process of the invention may be utilized to advantage in the distillation of oil shale. When conventional fluid operation is employed in the distillation of oil shale, advantage may normally be taken of the fact that oil shale disintegrates to fine particles when heated to distillation temperature so that fine grinding of the raw shale is not required and the fresh shale may be supplied to the fluidized bed in relatively large aggregates of, say, up to 2 in. diameter. However, in spite of the strong disintegration tendency of the shale, disintegration upon heating is not complete nor fully uniform for all aggregates supplied. Therefore, fluidization difficulties are frequently encountered as the result of the accumulation of large shale aggregates at the bottom of the bed. In accordance with the invention, the shale is fluidized by feeding fluidizing gas, such as air, oxygen or steam or suitable mixtures of these gases, to the bottom of the bed and, at the same time, tangentially injecting additional gas which may be either a free oxygen-containing gas or steam or a mixture of such gases, at one or more intermediate points along the height of the fluidized bed. When so operating, the vortex flow forces the large shale aggregates to the periphery of the bed so that they will ultimately collect at the bottom periphery thereof. This latter effect is enhanced as previously explained by maintaining a relatively low fluidizing gas velocity in the bottom of the bed. In this location, the undesirably large particles may either be subjected to selective combustion to accelerate their distillation and disintegration or they may be selectively withdrawn from the retort.

Another application where the selective removal of large particles from the reaction zone is desired is fluid coking of heavy oil residues. A heavy gas oil or residual oil is charged to a heated fluid bed of finely ground petroleum coke or other subdivided solid. Heat must be supplied to this bed—for example, by burning part of the coke in a separate vessel and circulating hot solids— to vaporize the oil and bring it up to reaction conditions. The hot oil breaks down, depositing coke on the solids present. By this means, the small solids particles which are charged gradually grow in size. It is advantageous to remove the coke, selectively, after it has reached some large particle size. The process of the invention may be used to accomplish this in a manner analogous to that described above with reference to shale retorting.

The maintenance of a general circular motion in a dense phase fluid bed also has considerable advantage in carrying out catalytic reactions. This type of flow makes possible a more uniform contacting of reactants and catalyst and insures a more uniform residence time of all catalyst particles in a reactor. It also causes more uniform fluidization with the elimination of phenomena known as slugging and channelling. The more uniform contacting of catalyst with reactants is conducive to a more uniform deposition of carbon on the catalyst in reactions such as catalytic cracking, naphtha reforming, and others which are accompanied by coke deposition. This minimizes the circulation of low grade, overcarbonized catalyst along with catalyst of good activity.

While the tangential injection of gas streams has been referred to above, it is noted that in many cases it may be desirable and advantageous to inject suspensions of subdivided solids-in-gases in this manner. When so operating, the momentum of the feed stream will be greatly increased due to its increased mass. As a result, a vortex motion may be imposed on the bed at relatively lower injection velocities, provided time has been given for the injected solids to approach or reach injected gas velocity. Since most operations here involved require continuous solids feed, no difficulties arise in connection with this type of operation. When so operating, injection velocities of the solids-in-gas suspension within the approximate range of 10–500 ft. per second may be sufficient to establish the desired vortex flow.

Regarding the upward injection of fluidizing gas into the bottom of the fluidized bed, this will be generally desirable to eliminate the stagnation in a non-fluidized state of any major portion of the bed. Such a stagnating layer may otherwise develop, particularly at a location opposite to and behind the lowest point of tangential gas injection and may extend almost up to a level below the next highest point of tangential gas injection.

Having set forth its objects and general nature, the invention will be best understood from the more detailed description hereinafter wherein reference will be made to the accompanying drawing in which Figure 1 is a schematic illustration of a system adapted to carry out the process of the invention in combination with the gasification of carbonaceous solids or similar processes;

Figure 2:
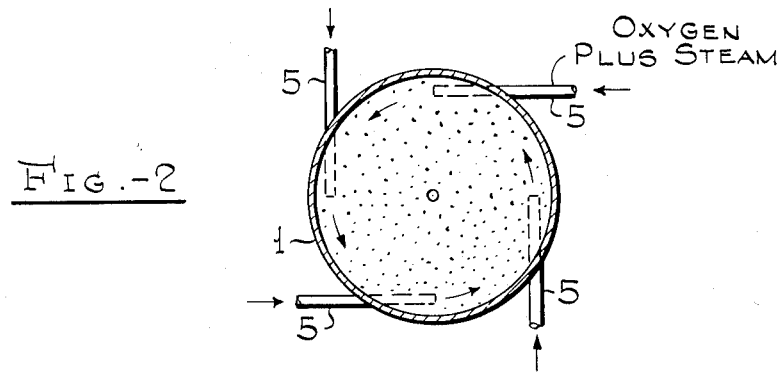
Figure 2 is a sectional plan along line II—II of Figure 1.
Figure 1:
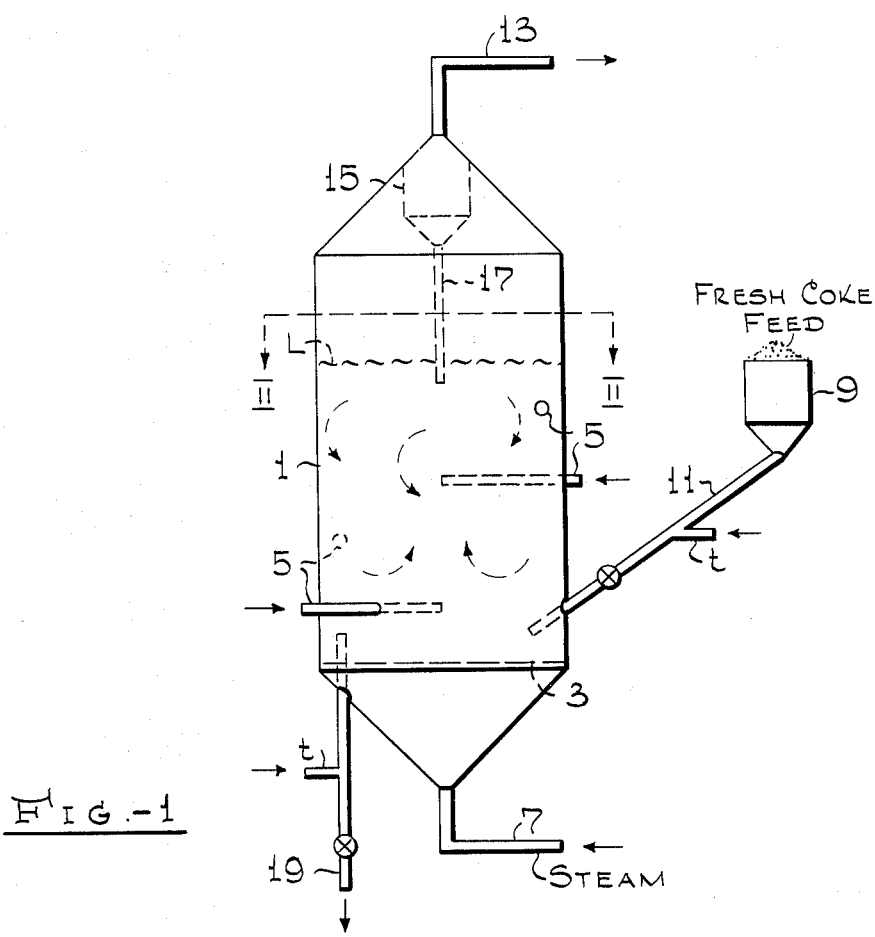

Referring now to Figures 1 and 2 of the drawing, the numeral 1 designates a gas generator consisting of an elongated vertically arranged cylindrical vessel provided in its bottom portion with gas distributing means such as grid 3. Four gas pipes 5 lead into vessel 1 above grid 3 at about equal distances along the height of vessel 1. As shown more clearly in Figure 2, the discharge ends of pipes 5 within vessel 1 are so arranged that gases injected through pipes 5 enter vessel 1 in a tangential direction to flow along the periphery of vessel 1.

In operation, vessel 1 contains a relatively dense, highly turbulent fluidized mass of subdivided coke M having an upper interface L. Mass M is maintained in the fluidized state by steam injected from line 7 through grid 3 into the bottom of vessel 1. Fresh coal or coke of fluidizable particle size is supplied from feed hopper 9 via a conventional standpipe 11 aerated through taps $t$ with small amounts of air, steam, flue gas or the like. Simultaneously, a mixture of oxygen and steam containing sufficient oxygen to supply by combustion the heat required by the endothermic reaction between carbon and steam is supplied through pipes 5. This gas mixture should enter vessel 1 at a velocity sufficient to superimpose a positive vortex flow on the turbulent motion of the solids imparted by the steam injected through grid 3. Product gas is recovered via line 13, if desired after separation of entrained solids fines in cyclone separator 15 provided with solids return line 17. Solid gasification residue may be withdrawn through conventional aerated standpipe 19 from any desired portion of mass M. Conventional gasification conditions of temperature and pressure may be employed in vessel 1, temperatures of about 1700°–1900° F. and pressures from atmospheric to 500 lbs. per sq. in. being preferred. The average particle size of the coal or coke supplied from hopper 9 may be about 60–80 microns with a wide distribution over the approximate range of 5–200 microns. The steam supplied through grid 3 should have a linear superficial upward velocity of about 0.3–1.0 ft. per second so that mass M will have an apparent density of about 20–50 lbs. per cu. ft. in the absence of any gas supply through pipes 5. The flow velocity of the gas entering vessel 1 through pipes 5 may fall within the approximate range of 400–1500 ft. per second. The quantity of this gas should be sufficient to establish a vertical velocity component of 0.5–3.0 ft. per second based on the cross-sectional area of vessel 1. The size and number of pipes 5 may be readily chosen to give these conditions. The total steam requirement at these conditions may be about 0.3–1.5 lbs. of steam per hour per lb. of carbon in the reactor. About 0.2–0.4 mol of oxygen per mol of steam is normally sufficient to supply the heat requirements of the process. About 50–85% of the steam requirement may be supplied through pipes 5.

When operating in this manner, mass M is maintained in the highly turbulent fluidized condition conducive to the most efficient heat exchange and gas-solids contact. Simultaneously, a solids flow pattern of the vortex type is superimposed on the fluidized mass which may generally follow the directions indicated by the flow arrows at the specific location, direction and rate of solids feed and withdrawal here involved. This results in combustion taking place predominantly in the peripheral portions of mass M involving particles circulating between top and bottom at least partly in a downward direction through this peripheral combustion zone. The particles passing through this combustion zone are deprived of their hydrogen content. Their steam reactivity is thus improved when they re-enter more central portions of mass M where they are contacted predominantly with steam. This effect is particularly pronounced when most of the oxygen is tangentially injected into the upper portion of the bed. Overheating in the peripheral combustion zone resulting in ash fusion may be minimized by admixing steam in amounts of about 2–3 mols per mol of oxygen with the gas injected through pipes 5. Fluidization irregularities below the lowest pipe 5 are avoided by the injection of gas through line 7.

The system illustrated in Figures 1 and 2 permits of various modifications. For example, more than one gas injection pipe may be arranged at the same level around the periphery of vessel 1 to enhance the vortex effect at this level. Fresh solids may be supplied from hopper 9 to steam line 7 to form a dilute suspension of feed solids in steam which may be fed via grid 3 to mass M. Instead of feeding a mixture of steam and oxygen through all pipes 5, steam and oxygen may be injected separately through individual pipes 5 in any order desired along the height of vessel 1, oxygen being preferably injected through one or more upper pipes. Whenever oxygen is referred to it will be understood that air or mixtures of oxygen with air may be used if the dilution of the product gas with nitrogen is not objectionable. Also, feed solids may be supplied together with tangentially injected steam or other gases containing no free oxygen. Other modifications within the spirit of the invention may appear to those skilled in the art.

Figure 3:
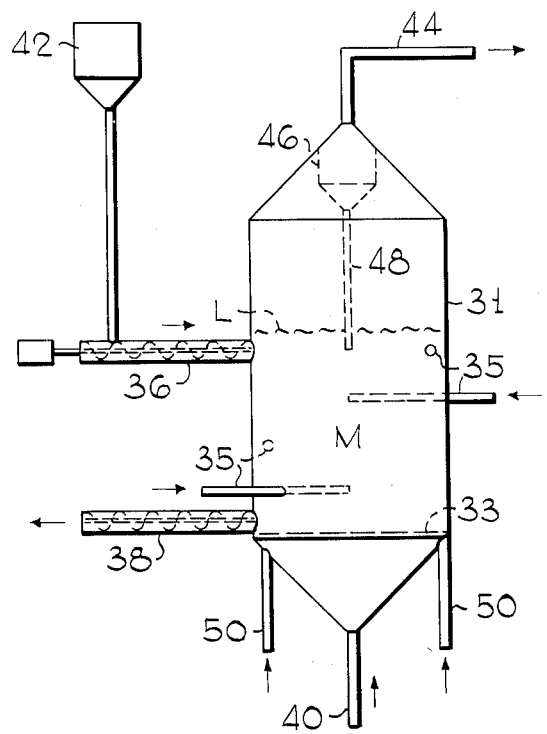
Figure 3 is a schematic illustration of a shale distillation system employing the process of the invention.

Referring now to Figure 3 of the drawing, the system illustrated therein is particularly adapted to the distillation of oil shale in accordance with the invention. A vertical elongated cylindrical retort 31 is equipped in its bottom portion with a gas distributing grid 33. A plurality of gas pipes 35 distributed over the height of retort 31 lead into retort 31 with their discharge ends arranged for a tangential injection of gases supplied therethrough. A solids feeding means, such as a screw conveyor 36, feeds into an upper portion of retort 31 while solids withdrawal means, such as a screw conveyor 38, is arranged in the bottom portion of retort 31 just above grid 33 with its pick-up end in the peripheral portion of retort 31.

In operation, retort 31 contains a relatively dense turbulent mass M of shale disintegrated as the result of distillation to a fluidizable particle size varying from about 5 to about 500 microns and having an upper level L. A fluidizing gas, such as steam or air or mixtures of such gases, is supplied via line 40 and grid 33 to the bottom of mass M at a linear superficial velocity of about 0.3–1.5 ft. per second, preferably about 0.5 ft. per second. Simultaneously, a gas such as steam, flue gas, a combustion-supporting gas or a desirable mixture of such gases is supplied through pipes 35 at a velocity conducive to the generation of a vortex flow of solids in mass M.

Mass M is maintained at conventional distillation temperatures of about 800°–1200° F. either by the sensible heat of the gases supplied thereto after being preheated to suitable temperatures or by feeding sufficient oxygen-containing gas through any of lines 35 and 40 to support a limited combustion within mass M and to generate the heat required for the distillation reaction, or by any suitable combination of these heating means. Coarse raw shale having a particle size of up to 2 in. diameter is supplied from hopper 42 by means of screw conveyor 36 to an upper portion of mass M. Most of the coarse shale upon entering mass M disintegrates to particles of a size readily fluidizable at the prevailing gas velocities. Larger shale aggregates, e. g. particles exceeding 1/10 in. in diameter, concentrate in the peripheral portions of mass M as the result of the vortex motion imposed by the tangential flow of the gas injected through pipes 35. These large aggregates collect in the periphery of the bottom portion of mass M and may be withdrawn therefrom by screw conveyor 38 to be returned to hopper 42 or to be withdrawn from the system. Flow velocities of about 400–1500 ft. per second, preferably about 400–800 ft. per second, of the gases injected through pipes 35 are usually adequate to bring about this classification effect. A mixture of volatile distillation products, feed gases and gaseous combustion products is recovered via line 44 after separation of entrained solids in cyclone 46 provided with solids return pipe 48.

The system shown in Figure 3 may be modified in various respects. In the first place, the coarse shale aggregates collecting on the periphery of grid 3 may be selectively subjected to a combustion reaction by introducing a combustion-supporting gas, such as air and/or oxygen, through a plurality of lines 50 distributed around the periphery of retort 31. In this manner, a substantial proportion of the coarse aggregates may be further distilled and disintegrated as the result of this relatively more severe heat treatment. Heat supply in the form of sensible heat of feed gases alone requires large amounts of steam or the like which may be undesirable while heat supply chiefly by internal combustion either requires about 400–1500 s. c. f. of oxygen per ton of shale, which is expensive, or, when air is used, leads to an excessive dilution of the distillate vapors with nitrogen which complicates product recovery. This may be avoided by withdrawing spent shale from retort 31, subjecting it to a combustion reaction with air in a separate heater and supplying the heat required for retorting in the form of sensible heat of hot combustion residue returned from the heater, all in a manner known per se (see for instance U. S. Patent No. 2,480,670).

The system of Figure 3 may also be used for coking heavy oil residues. In this case, the oil feed together with steam or hydrocarbon vapors or gases may be supplied through line 40 and/or any of pipes 35. Steam or hydrocarbon gases may also be supplied through those lines through which no heavy residue is fed, so as to establish the desired fluidized vortex pattern. Finely divided coke or other inert or catalytically active solids of fluidizable size may be supplied through line 36. The size of the solids particles within the fluidized bed increases in the course of the coking reaction due to coke deposition. Large coke aggregates thus formed concentrate in the bottom periphery and may be withdrawn via line 38 for coke recovery and/or recycle through line 36, preferably after grinding to a fluidizable size. Other modifications may appear to those skilled in the art.

Figure 4:
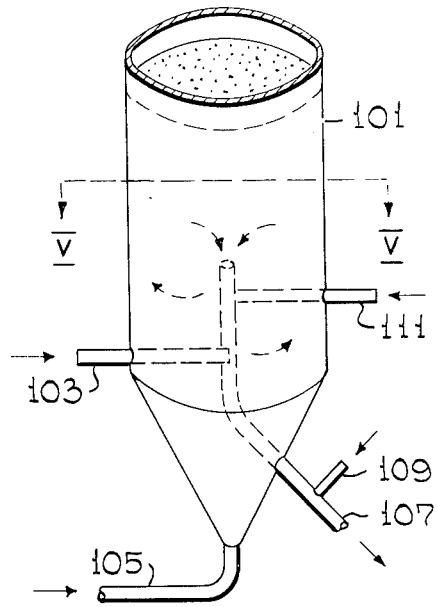
Figure 4 is an isometric view of a system particularly adapted for catalytic or non-catalytic vapor phase reactions.
Figure 5:
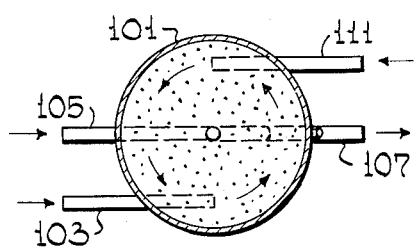
Figure 5 is a sectional plan along line V—V.

A method of carrying out the invention in connection with a reaction such as the cracking of oil is illustrated in Figures 4 and 5. The cracking may be catalytic or it may be thermal, inert solids being used in this case. The catalyst or other solid is introduced in the form of a solids-in-gas suspension into reactor 101 tangentially through pipe 103 at a point in the cylindrical portion of reactor 101 such that a maximum amount of circular motion is attained. Pipe 103 may be inclined slightly upwards to impart an upward vertical component of velocity to the bed. However, in most cases this is not necessary since normally sufficient upward component is provided by the tendency of the gases to rise through the bed. The vertical component may also be enhanced by fluidizing and stripping gas introduced through pipe 105.

It is important that pipe 103 enter into the cylindrical portion of reactor 101 rather than in the cone below it if a circular motion is to be attained which will travel to the top of the fluidized bed. Pipe 103 may be placed inside the reactor shell so that its discharge end is removed by a distance of 1/2–2 times the diameter of pipe 103 from the reactor wall in order to reduce friction losses against the reactor wall. The general direction of flow is illustrated by the flow arrows showing how the dense phase fluidized bed travels—under the influence of the specific location, direction and rate of solids feed and withdrawal here involved—upwardly around the outside of the bed and then downwardly at the center of the bed, solids being withdrawn through a centrally located pipe 107. The solids may be aerated and stripped by gas entering at line 109.

For ordinary silica-alumina cracking catalysts and solids of comparable density, the fluidized bed should have a circular motion such that it passes around reactor 101 completing 1–60, preferably about 3–30, revolutions per minute. This velocity is preferably in the range of 6–12 revolutions per minute for reactors having diameters of 10–50 ft. and will vary with the particle size and density of the fluidized bed and should be chosen in such a way as to avoid excessive separation of solids from gases by cyclonic action. Suspension injection velocities through line 103 of about 10–500 ft. per second may be used. Solids particle sizes of about 5–200 microns, preferably about 20–100 microns, and apparent bed densities of about 20–40 lbs. per cu. ft. are suitable for most purposes. The actual gas injection velocity suitable to establish the circular velocity here described is a function of vessel size, number of injection points, solids content of the gas and total volume of gas injected; this injection velocity will be in the range of 400–1000 ft. per second in the absence of solids in this gas, and may readily be determined in each individual case by routine tests.

Various modifications of the apparatus shown in Figure 4 may be used. The circular velocity of the entering solids may be attained by mixing them with a higher velocity gas or vapor stream in line 103. This gas or vapor may consist of or comprise the reactants or any inert or recycle gas stream. The reactants may alternatively be introduced through line 111 when it is desirable to have the solids in line 103 attain reactor temperature before contacting the feed, for example in the case of hot regenerated catalyst being injected through line 103 at a temperature above reaction temperature. When most of the impelling fluid is introduced through line 111 independently of the solids feed through line 103, it may be desirable to arrange pipe 111 at a level below that of pipe 103 to minimize settling of solids into the bottom of reactor 101. It will be understood that circular motion may also be promoted by introducing the reactants and/or other gas at high velocity through additional tangential jets as described with reference to Figures 1–3.

Figure 7:
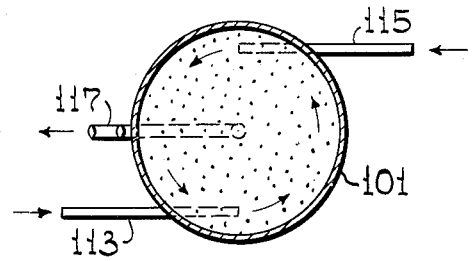
Figure 7 is a sectional plan along line VII—VII of Figure 6 illustrating the method of gas injection.
Figure 6:
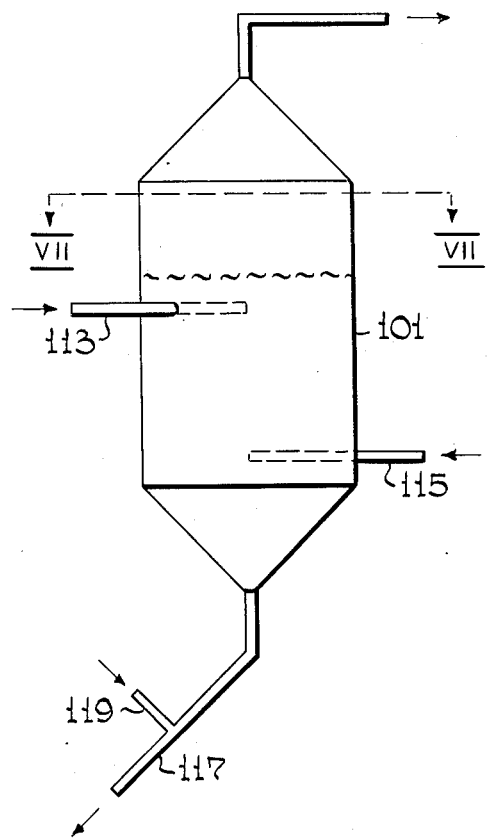
Figure 6 is a schematic illustration of a system similar to that of Figure 4 without bottom feed of fluidizing gas.

Figures 6 and 7 illustrate a modification in which the solid is allowed to flow in a circular downward direction by introducing it tangentially in the upper part of reactor 101 through line 113 while introducing the reactants tangentially in the lower part of the bed through line 115. The solids may be introduced with an inert gas such as steam, flue gas, or recycle gas through line 113. Spent solids are withdrawn through line 117, aerated and stripped by gas introduced through line 119.

The type of flow described with reference to the systems illustrated in the drawing is useful in a wide variety of catalytic and thermal reactions. These include, in addition to catalytic cracking and naphtha reforming, other catalytic reactions such as hydroforming. In the case of hydroforming, it is particularly advantageous to admix the hydrogen-rich stream with the hot regenerated catalyst while introducing the naphtha feed through a separate line into the fluidized bed. Other useful reactions include those of polymerization of olefins, oxidation of hydrocarbons and thermal contacting of hydrocarbons, such as naphthas and gases with solids at high temperatures, etc.

It will also be understood by those skilled in the art that the systems illustrated in the drawing may be applied in a generally analogous manner to a great variety of other gas-solids contacting processes, such as hydrocarbon synthesis, roasting and reducing of ores, adsorption processes of all types, heating or cooling methods involving direct or indirect heat exchange between solids or solids and gases, etc. All reaction conditions not specifically described in the above examples are those conventional and well known in the art of the processes involved.

The foregoing description and exemplary operations have served to illustrate specific embodiments of the invention but are not intended to be limiting in scope.

What is claimed is:

1. The method of contacting solids with gases, which comprises maintaining in a contacting zone a substantially cylindrical column of subdivided solids, injecting solids suspended in a gasiform medium into the periphery of said column in along a non-radial, secant path at a velocity of 10 to 500 feet per second sufficient to maintain the solids in said column in the form of a dense, turbulent, fluidized mass and to impose a vortex flow on said column, withdrawing gasiform medium upwardly from said column, and withdrawing solids downwardly from said column separately from said withdrawn gasiform medium.

2. The method of claim 1 in which said velocity is so controlled that said column completes at least 3 to 30 revolutions per minute.

3. The method of carrying out catalytic hydrocarbon conversions, which comprises maintaining in a conversion zone at conversion conditions a substantially cylindrical column of subdivided conversion catalyst of fluidizable size, injecting subdivided fluidizable catalyst suspended in a gasiform fluid into the periphery of a lower portion of said column along a non-radial, secant path at a velocity of 10 to 500 feet per second to maintain the catalyst in said column in the form of a dense, turbulent fluidized mass and to impose a vortex flow on said column, injecting a gasiform stream of hydrocarbons to be converted into the periphery of said column along a non-radial, secant path at a point below that of catalyst injection and at a velocity of 400 to 800 feet per second to enhance said vortex flow, injecting a gasiform medium upwardly into the bottom of said column at a linear velocity of about 0.1 to 0.5 feet per second, withdrawing volatile conversion products upwardly from said column and withdrawing catalyst downwardly from a central portion of said column.

4. The method of carrying out catalytic hydrocarbon conversions, which comprises maintaining in a conversion zone at conversion conditions a substantially cylindrical column of subdivided conversion catalyst of fluidizable size, injecting subdivided fluidizable catalyst suspended in a gasiform fluid into an upper portion of the periphery of said column along a non-radial, secant path at a velocity of 10 to 500 feet per second to maintain the catalyst in said column in the form of a dense, turbulent fluidized mass and to impose a vortex flow on said column, injecting a gasiform stream of hydrocarbons to be converted into a lower portion of said periphery along a non-radial, secant path at a velocity of 400 to 800 feet per second to maintain the catalyst in said column in the form of a dense, fluidized mass of solids and to impose a vortex flow on said column, withdrawing volatile conversion products upwardly from said column and withdrawing catalyst downwardly from a lower portion of said column.

5. The method according to claim 1 wherein said solids comprise carbonaceous solids, said contacting zone is a gasification zone, said gasiform medium introduced along a non-radial secant path comprises a free oxygen-containing gas and the gasiform medium withdrawn upwardly from said column comprises a fuel gas.

6. The method according to claim 1 wherein the solids comprise oil-bearing minerals which tend to disintegrate upon distillation, said contacting zone comprises a distillation zone and coarse aggregates of fresh oil-bearing minerals are supplied to an upper portion of said column and the gasiform medium withdrawn upwardly from said column comprises volatile distillation products.

7. The method according to claim 1 wherein said contacting zone comprises a coking zone for heavy hydrocarbonaceous residues and wherein the gasiform medium withdrawn upwardly from said column comprises volatile products resulting from the coking of the heavy hydrocarbonaceous residue.

References Cited in the file of this patent

UNITED STATES PATENTS

| | | |
|---|---|---|
| 2,374,518 | Wolk et al. | Apr. 24, 1945 |
| 2,394,651 | Alther | Feb. 12, 1946 |